(12) United States Patent
Balakrishnan et al.

(10) Patent No.: US 10,671,958 B2
(45) Date of Patent: *Jun. 2, 2020

(54) ANALYTICS TO DETERMINE CUSTOMER SATISFACTION

(71) Applicant: INTERNATIONAL BUSINESS MACHINES CORPORATION, Armonk, NY (US)

(72) Inventors: Karthik Balakrishnan, White Plains, NY (US); Keith A. Jenkins, Sleepy Hollow, NY (US); Barry P. Linder, Hastings-on-Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/406,157

(22) Filed: May 8, 2019

(65) Prior Publication Data

US 2019/0266538 A1 Aug. 29, 2019

Related U.S. Application Data

(63) Continuation of application No. 15/221,185, filed on Jul. 27, 2016, now Pat. No. 10,360,526.

(51) Int. Cl.
*G06Q 10/06* (2012.01)
*G06K 9/00* (2006.01)
*G06K 9/62* (2006.01)

(52) U.S. Cl.
CPC ... *G06Q 10/06393* (2013.01); *G06K 9/00302* (2013.01); *G06K 9/00335* (2013.01); *G06K 9/6267* (2013.01); *G06K 9/00288* (2013.01)

(58) Field of Classification Search
None
See application file for complete search history.

(56) References Cited

U.S. PATENT DOCUMENTS 9,223,885 B2 12/2015 Marisco
2004/0080399 A1 4/2004 Foster et al.
(Continued)

FOREIGN PATENT DOCUMENTS

EP 2787459 A1 * 10/2014 ......... G06F 19/3475

OTHER PUBLICATIONS

Anonymous, "Method and System for Gesture-based Touchless Gathering of Customer Satisfaction/Feedback," Nov. 2, 2015, ip.com, p. 1 (Year: 2015).*

(Continued)

*Primary Examiner* — Amanda Gurski
(74) *Attorney, Agent, or Firm* — Tutunjian & Bitetto, P.C.; Vazken Alexanian

(57) ABSTRACT

A computer-implemented method for analyzing customer satisfaction is presented. The computer-implemented method may include capturing visual images related to individuals and order consumables, determining, by a processor, at least one measurable metric to predict variations indicating different satisfaction levels, and dynamically refining parameters if the variations exceed one or more thresholds. The computer-implemented method further includes receiving the captured visual images of the individuals and the order consumables by least one camera in communication with the processor.

18 Claims, 11 Drawing Sheets

(56) References Cited

U.S. PATENT DOCUMENTS

| | | | | |
|---|---|---|---|---|
| 2004/0177004 | A1* | 9/2004 | Mueller | G06Q 20/20 |
| | | | | 705/15 |
| 2006/0259347 | A1 | 11/2006 | Ohashi | |
| 2013/0041720 | A1 | 2/2013 | Spires | |
| 2013/0157232 | A1* | 6/2013 | Ehrenkranz | G01G 19/4146 |
| | | | | 434/127 |
| 2014/0222501 | A1* | 8/2014 | Hirakawa | G06Q 30/0201 |
| | | | | 705/7.29 |
| 2016/0171514 | A1* | 6/2016 | Frank | G06F 16/337 |
| | | | | 705/7.29 |

OTHER PUBLICATIONS

Lois A Mohr and Mary Jo Bitner, "The Role of Employee Effort in Satisfaction with Service Transactions," Mar. 1995, Journal of Business Research, vol. 32, Issue 3, pp. 239-252 (Year: 1995).*

List of IBM Patents or Patent Applications Treated as Related dated May 8, 2019, 2 pages.

Anonymous, "Method and System for Gesture-based Touchless Gathering of Customer Satisfaction/Feedback," ip.com, Nov. 2015. (pp. 1-3).

* cited by examiner

ANALYTICS TO DETERMINE CUSTOMER SATISFACTION

BACKGROUND

Technical Field

The present invention relates generally to a computer-implemented method for analyzing customer satisfaction, and more specifically, to a computer-implemented method for determining at least one measurable metric to predict variations indicating different satisfaction levels. The present invention relates further to a system for analyzing customer satisfaction, and a computer program product.

Description of the Related Art

Customer service remains a high priority for most organizations providing products and/or services. Ongoing complaints can result in customers taking their business to competitors. In the age of instant communication via the Internet and social media, negative publicity can quickly lead to the downfall of an organization that fails to take corrective action in a timely manner.

Many organizations track overall customer satisfaction on a fairly regular basis, but the response is typically retroactive. That is, many organizations ask their customers to complete a traditional survey after making a purchase or having interacted with the organization, asking for customer opinions of particular transactions. The survey is intended to gauge the customers overall satisfaction with a product and/or delivery of a service. The survey may also inquire how the organization might improve the customer experience in the future. The collected surveys are generally manually scanned to identify problems so that corrective action can be taken. However, by the time corrective action is taken, it is too late to prevent customer dissatisfaction which can lead to negative publicity.

SUMMARY

In accordance with one embodiment of the present principles, a computer-implemented method for analyzing customer satisfaction is provided. The computer-implemented method includes capturing visual images related to individuals and order consumables. The computer-implemented method further includes determining, by a processor, at least one measurable metric to predict variations indicating different satisfaction levels. The computer-implemented method further includes dynamically refining parameters if the variations exceed one or more thresholds.

In accordance with another embodiment of the present principles, a system for analyzing customer satisfaction is provided. The system includes at least one camera to capture images related to individuals and order consumables. The system further includes a processor coupled to the at least one camera to apply at least one measurable metric to predict variations indicating different satisfaction levels and to dynamically refine parameters if the variations exceed one or more thresholds.

Furthermore, embodiments may take the form of a related computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

Throughout the drawings, same or similar reference numerals represent the same or similar elements.

DETAILED DESCRIPTION

The present principles are directed to systems and methods for analyzing customer satisfaction. In some embodiments, the present principles provide systems, methods and computer program products to facilitate interactions between customers of a restaurant and the restaurant itself. In some embodiments, the systems, methods and computer program products described herein relate to analyzing customer satisfaction using a plurality of different data streams and analytics. The systems and methods provide for continuous video monitoring of food plates and drinks, as well as customer reactions to food plates and drinks. Data analytics are used to determine customer satisfaction by using measurable metrics. Metrics include, but are not limited to, meal rate, meal item consumption amount of leftover meal, amount of leftover meal item, customer reaction upon initial consumption, and customer reaction upon consumption of one or more meal items.

The systems and methods provide for different techniques of obtaining data related to food plates and drinks, as well as customers. The different techniques include using face recognition devices, emotion recognition devices, gesture recognition devices, speech recognition devices, and/or image processing. The methodology for obtaining such data may be refined, in real-time, by sending dynamic feedback to the restaurant for enabling at least menu customization and/or price customization and/or personnel adjustments. Further, combining face recognition, emotion recognition, gesture recognition, and speech recognition of customers with image processing of food plates and drinks, leads to enhanced customer experience at restaurants and also allows the restaurant to dynamically alter a number of different variables/parameters, such as presentation, menu, pricing, and personnel, which further leads to optimization of restaurant profits. Therefore, according to the present principles, customer satisfaction or customer satisfaction levels may be accurately predicted and fed back to restaurants.

Figure 1:
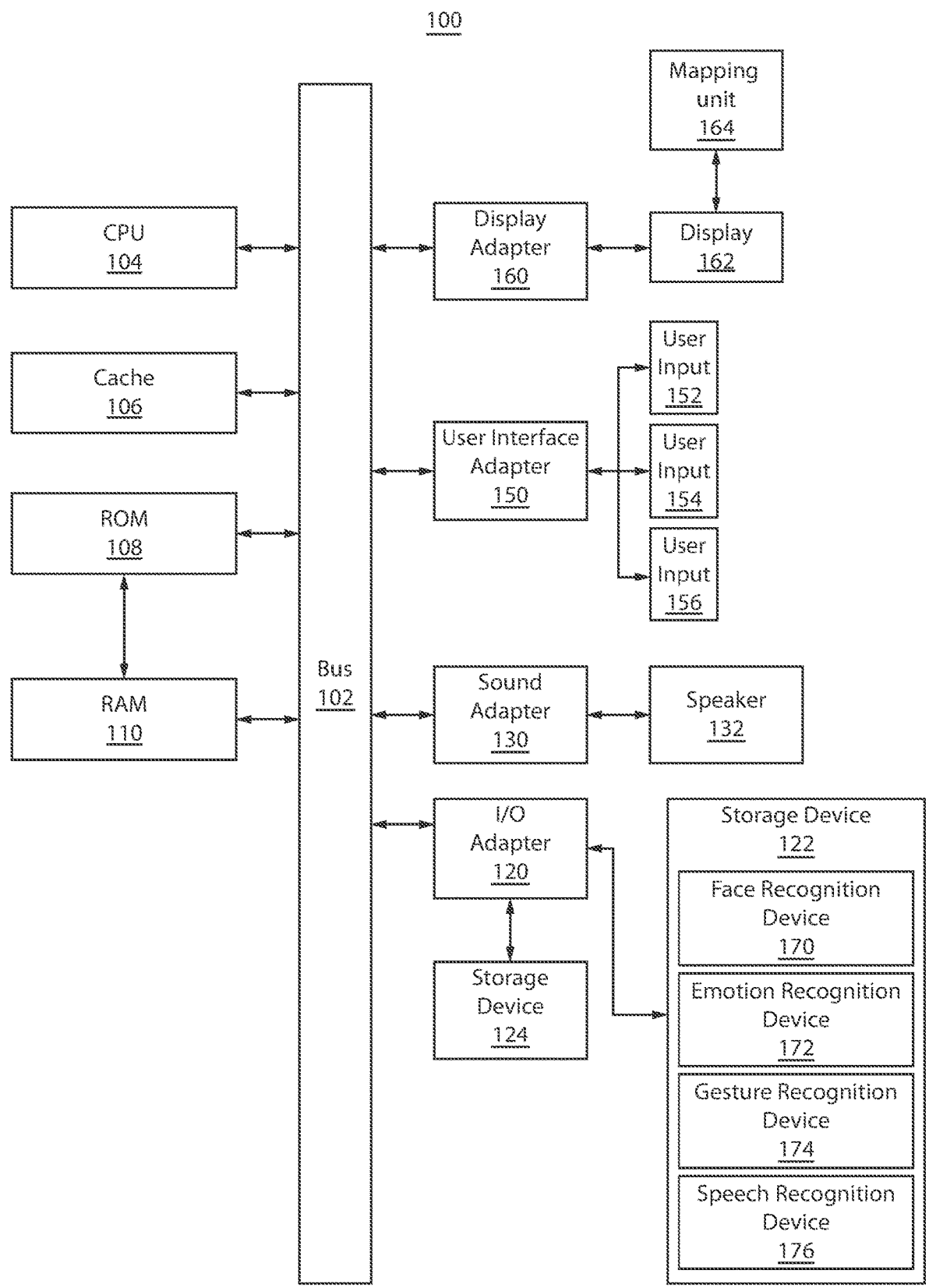
FIG. 1 is a block/flow diagram of an exemplary computing system for analyzing customer satisfaction, in accordance with an embodiment of the present principles.

Referring now to the drawings in which like numerals represent the same or similar elements and initially to FIG. 1, a block/flow diagram of an exemplary computing system for analyzing customer satisfaction is presented, in accordance with an embodiment of the present principles.

An exemplary customer satisfaction processing system 100 to which the present principles may be applied is shown in accordance with one embodiment. The customer satisfaction processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices. The I/O adapter 120 further communicates with a face recognition device 170, an emotion recognition device 172, a gesture recognition device 174, and a speech recognition device 176 for analyzing customer satisfaction.

A speaker 132 is operatively coupled to system bus 102 by the sound adapter 130. A display device 162 is operatively coupled to system bus 102 by display adapter 160. A mapping unit 164 for executing customer satisfaction mapping functions/operations is operatively coupled to the display device 162. In an alternative embodiment, the mapping unit 164 may be incorporated with the display device 162. The display device 162 may display a customer satisfaction map 700, as discussed below with reference to FIG. 7.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from customer satisfaction processing system 100.

Of course, the customer satisfaction processing system 100 may also include other elements (not shown), as readily contemplated by one of skill in the art, as well as omit certain elements. For example, various other input devices and/or output devices can be included in the customer satisfaction processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the customer satisfaction processing system 100 are readily contemplated by one of ordinary skill in the art given the teachings of the present principles provided herein.

Figure 2:
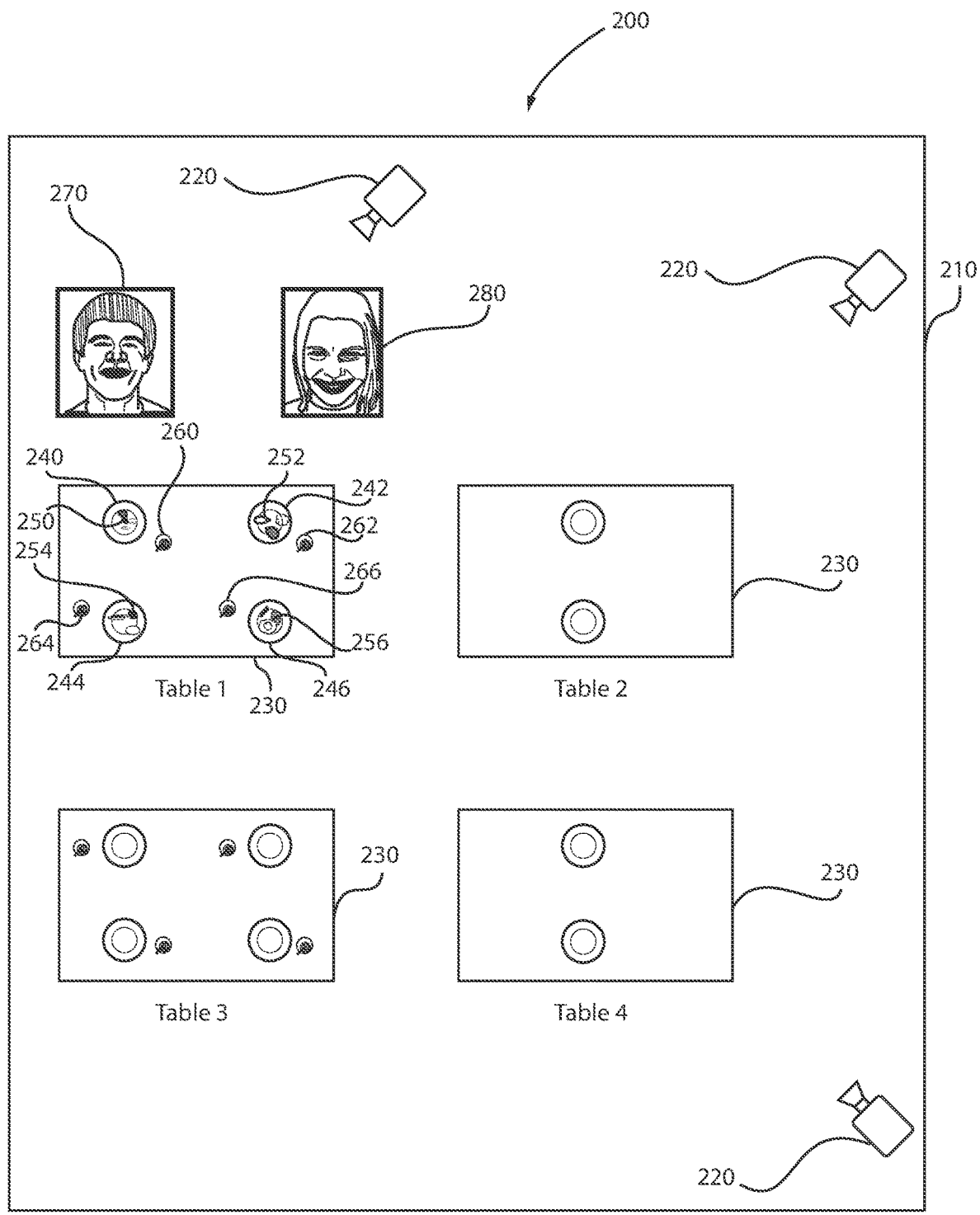
FIG. 2 illustrates a system for capturing visual images related to individuals and order consumables at a restaurant at a first point in time, in accordance with an embodiment of the present principles.

FIG. 2 illustrates a system for capturing visual images related to individuals and order consumables at a restaurant at a first point in time, in accordance with an embodiment of the present principles.

The restaurant 210 may be any type of food or eating establishment or facility contemplated by one skilled in the art. The restaurant 210 includes a plurality of tables 230. For example, four tables 230 are shown in restaurant 210 (i.e., "Table 1," "Table 2," "Table 3," and "Table 4"). Two customers 270, 280 are accommodated at "Table 1." Customer 270 is a male customer, whereas customer 280 is a female customer. Each table 230 may include plates and drinks. As shown, "Table 1," where customers 270, 280 are seated, includes plates 240, 242, 244, 246. Plate 240 includes food items 250, plate 242 includes food items 252, plate 244 includes food items 254, and plate 246 includes food items 256. Additionally, each plate 240, 242, 244, 246 may be associated with a drink 260, 262, 264, 266.

The system 200 further includes a plurality of imaging devices or cameras 220. For example, a camera may be strategically placed or positioned on the ceiling or walls of the restaurant 210. In one embodiment, a camera 220 is positioned at each corner of the restaurant. In another embodiment, a camera 220 is positioned over or in proximity to each and every table of the restaurant 210. In another embodiment, a first set of cameras 220 may be associated with each customer of the restaurant 210, a second set of cameras 220 may be associated with each employee of the restaurant 210, and a third set of cameras may be associated with each table of the restaurant 210. One skilled in the art may contemplate a plurality of different cameras 220 positioned or placed on various parts of the restaurant 210 to monitor individual parameters/variables or different sets of parameters/variables. One skilled in the art may also contemplate wireless communication between the plurality of cameras 220 within the restaurant 210, where cameras exchange information and/or detect patterns related to one or more monitored variables/parameters.

In FIG. 2, the cameras 220 capture visual images related to individuals and order consumables (i.e., content of food plates and drinks) continuously, and in real-time. The visual images are captured from the moment a customer/individual enters the restaurant 210 until the moment the customer/ individual exits the restaurant 210 (or the premises of the restaurant 210). The visual images may also be captured in predetermined time periods/intervals. For example, visual images may be captured every few seconds or may be captured the moment customers receive food plates and/or drinks. Visual images may be captured each time a specific event occurs and is identified by, for example, the face recognition device 170, the emotion recognition device 172, the gesture recognition device 174, and the speech recognition device 176, as well as the image processing device or cameras 220. In FIG. 2, the visual images were captured at a first point in time, that being, the moment at which the food plates 240, 242, 244, 246 or order consumables 250, 252, 254, 256 were received by the customers 270, 280. Therefore, FIG. 2 represents a snapshot of the order consumables 250, 252, 254, 256 in a first or initial state and a snapshot of facial images of the customers 270, 280 at the first or initial state.

Figure 3:
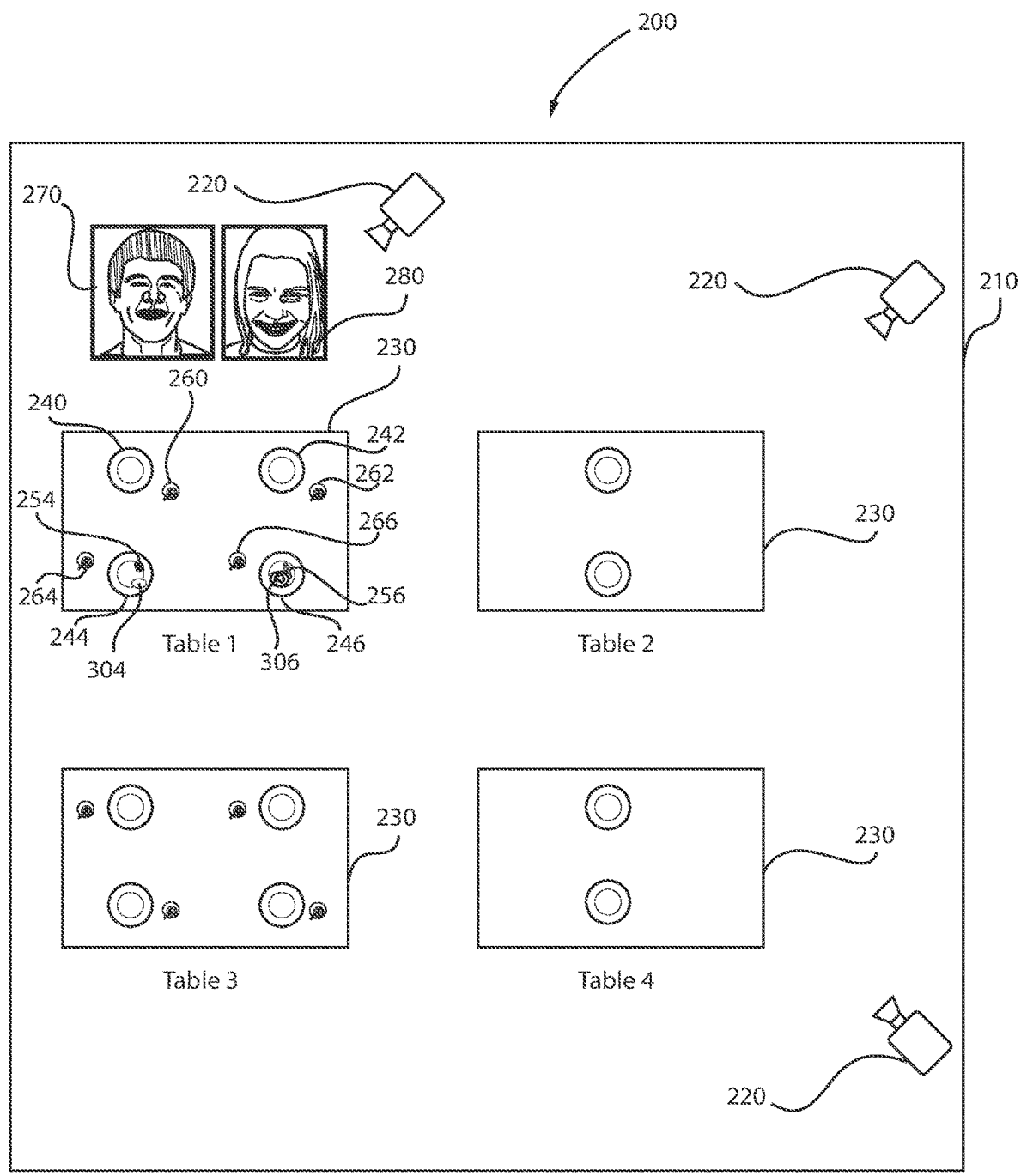
FIG. 3 illustrates the system of FIG. 2 for capturing visual images related to individuals and order consumables at a restaurant at a second point in time, in accordance with an embodiment of the present principles.

FIG. 3 illustrates the system of FIG. 2 for capturing visual images related to individuals and order consumables at a restaurant at a second point in time, in accordance with an embodiment of the present principles.

FIG. 3 represents a snapshot of the order consumables 250, 252, 254, 256 in a second or final state and a snapshot of facial images of the customers 270, 280 at the second or final state. Thus, in FIG. 3, the visual images were captured at a second point in time, that being, the moment at which the order consumables 250, 252, 254, 256 were consumed by the customers 270, 280 or at the point in time that the meal has ended for the customers 270, 280. The second point in time, may be, for example, the moment at which a server (not shown) approaches the customers 270, 280 and the customers 270, 280 signal that they have completed their meal at the restaurant 210.

As shown in FIG. 3, plate 244 includes meal leftovers 304 and plate 246 includes meal leftovers 306. In contrast, plates 240 and 242 are shown completely empty. In other words, customers 270, 280 consumed all the order consumables or food items 250, 252 of plates 240, 242, respectively, whereas customers 270, 280 did not consume all of the food items 254, 256 of plates 244, 246, thus resulting in leftovers 304, 306. At the second point in time, at least one camera 220 of the restaurant 210 captures the visual images related to the customers 270, 280 at the end of the meal and further captures visual images of the content of the plates 240, 242, 244, 246. The visual images of the content of the plates 240, 242, 244, 246 reveal that two plates are empty and that two plates include leftovers 304, 306. Such visual images are transmitted to one or more displays, as discussed below with reference to FIG. 4. Additionally, the facial images of the customers 270, 280 are transmitted to one or more displays, as discussed below with reference to FIG. 4.

Figure 4:
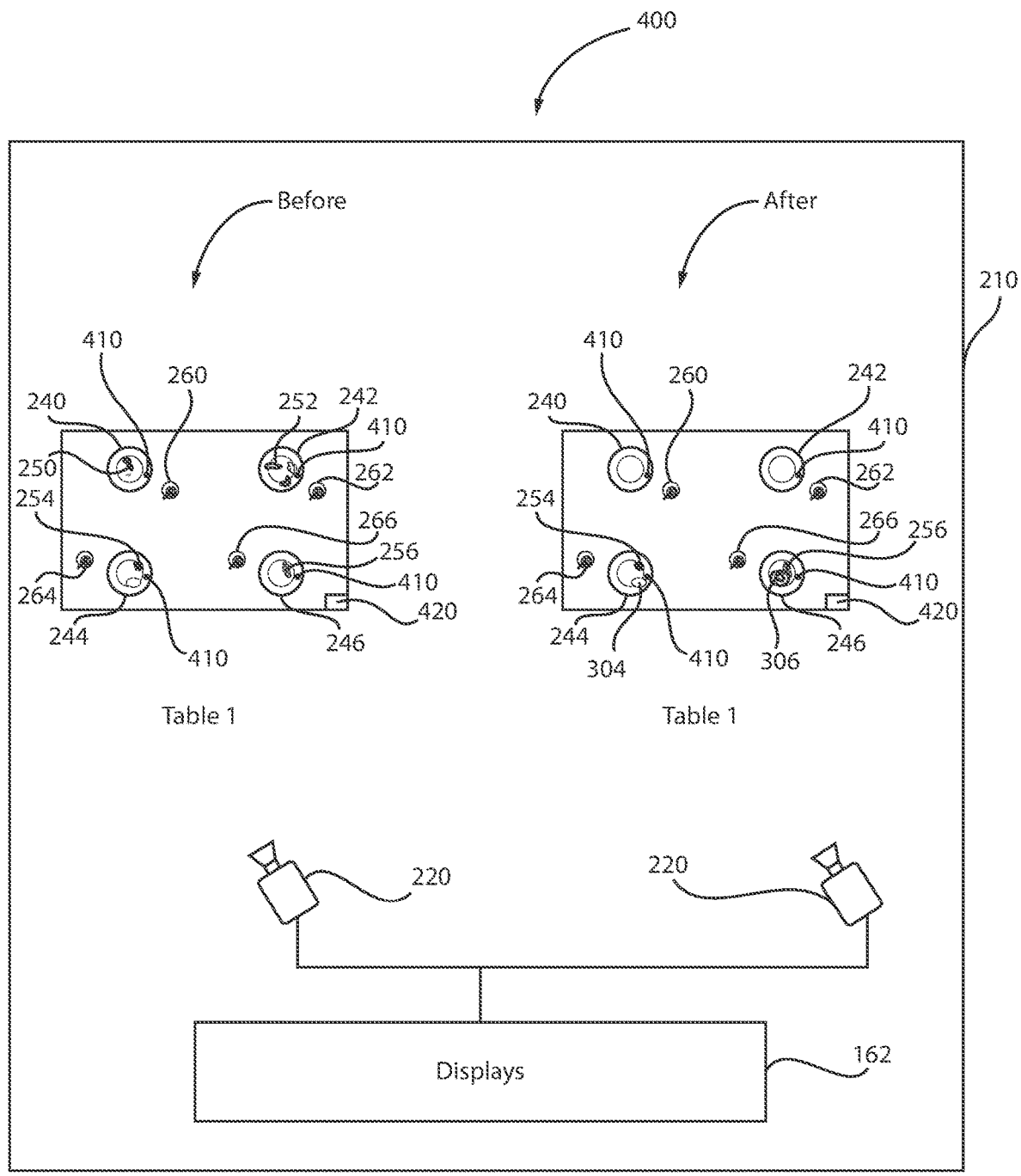
FIG. 4 illustrates a comparison of the order consumables at two points in time, as well as additional processing units embedded within tables and tableware of the restaurant, in accordance with an embodiment of the present principles.

FIG. 4 illustrates a comparison of the order consumables at two points in time, as well as additional processing units embedded within tables and tableware of the restaurant, in accordance with an embodiment of the present principles.

The system 400 illustrates a snapshot of "Table 1" at a first point in time and a snapshot of "Table 1" at a second point in time. The first point in time is defined as the moment when the customers 270, 280 (FIGS. 2 and 3) received the plates 240, 242, 244, 246 with the food items 250, 252, 254, 256. The second point in time is defined as the moment when the customers 270, 280 (FIGS. 2 and 3) indicated completion of their meal and just before the server(s) remove the plates 240, 242, 244, 246 from "Table 1."

Moreover, each plate 240, 242, 244, 246 may include a processing unit 410 and each table 230 may include a processing unit 420. The processing units 410 may be attached or incorporated within the plates 240, 242, 244, 246 and the processing units 420 maybe attached or incorporated within the tables 230. The processing units 410, 420 are used to collect data/information regarding food consumption, waste of food, drink consumption, waste of drinks, etc. This information can be transmitted to the one or more displays 162 to further refine or calibrate or dynamically modify at least menus, pricing, servings, and/or restaurant support staff.

The snapshots of the "before" and "after" images are captured by at least one camera 220 and transmitted to one or more displays 162. The one or more displays 162 are connected to hardware loaded with various software programs for analyzing the "before" and "after" visual images. The comparison of the "before" and "after" images reveals that two plates 244, 246 include leftovers 304, 306. The analysis may include at least determining rate of consumption of the food items and food item preferences. Therefore, each food item on each plate may be analyzed in detail to determine which exact food items were consumed, the order of consumption of each item, which food items were not consumed, which food items were partially consumed, which food items took the longest to consume, which food items were consumed the quickest, which food items were moved to different plates, which food items were sent back, which food items were replenished, time of overall food consumption, and time of consumption of each food item. Additionally, similar analytics may be determined for drinks.

Since a succession of visual images of the food items 250, 252, 254, 256 is obtained throughout the course of the entire meal, from start to finish, "before" and "after" visual images may be compared at various stages of the meal. Comparison may be made between visual images obtained at the beginning of the meal and visual images obtained at the end of the meal. However, a comparison may be made between images obtained at the beginning of the meal and a number of different points in time before the end of the meal. For example, a comparison of visual images may be made between images obtained at the beginning of meal and a point when a server asks the customers 270, 280 for feedback of the meal. Another comparison of visual images may be made between that point when the server asked the customers 270, 280 for feedback of the meal and the end of the meal. Thus, a comparison of images may be made before and after the server asks the customers 270, 280 for feedback. One skilled in the art may contemplate a number of different scenarios involving a number of different points in time to perform comparison of visual images.

Therefore, data analytics are used to determine customer satisfaction by using measurable metrics. Metrics include, but are not limited to, meal rate, meal item consumption, amount of leftover meal, amount of leftover meal item, customer reaction upon initial consumption, and customer reaction upon consumption of one or more meal items. Metrics may also involve a time taken to eat or consume each course, time taken to flag a server, customer looking for a server, time taken to find the server, tips received by each server, and various mood evolution analytics for assessing human emotional behavior. The human emotional behavior may include heart rate and skin temperature of the customers, in addition to facial expressions, gestures, mood, etc. The metrics allow for the prediction of variations indicating different satisfaction levels for customers/individuals visiting a food or eating facility, such as a restaurant. Each of the metrics may be associated with a threshold set by the restaurant. If the variations exceed one or more thresholds, then the restaurant may dynamically refine one or more variables/parameters in real-time. The refining may evolve from, for example, establishing a corrective action plan.

Moreover, a predetermined weight may be applied or associated with each metric. Therefore, the relevance of each metric data may be taken into consideration before a notification, warning, or alert is displayed on a customer satisfaction map, as will be described below with reference to FIG. 7. Also, each of the weights may be periodically updated to reflect changes in the relevance of the metric data.

Of course, in addition to obtaining and comparing order consumable images, a comparison of facial images of the customers 270, 280 may also be performed, as discussed below with reference to FIG. 5.

Figure 5:
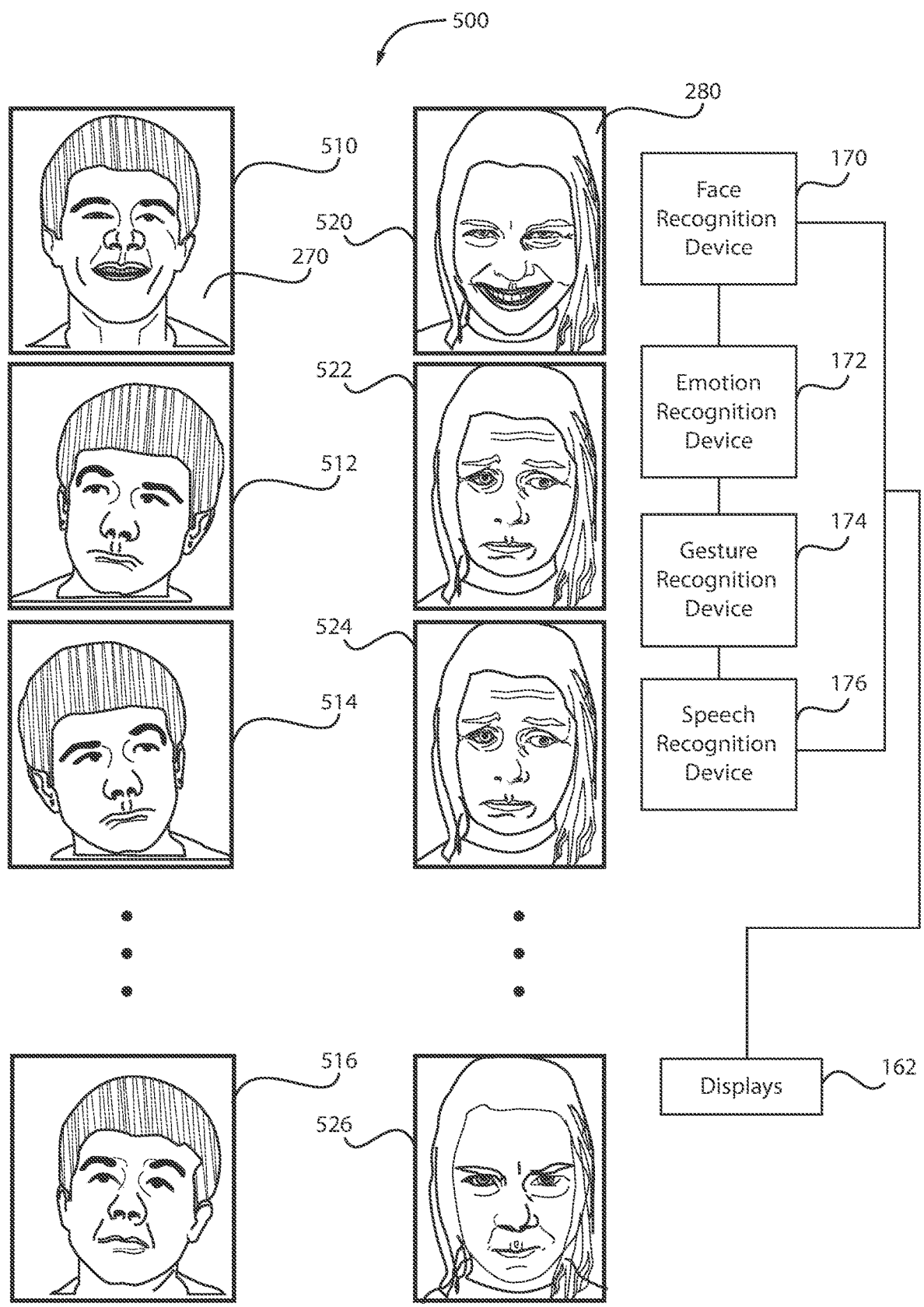
FIG. 5 illustrates a succession of facial images of individuals from a starting point of a meal to an ending point of the meal, in accordance with an embodiment of the present principles.

FIG. 5 illustrates a succession of facial images of individuals from a starting point of a meal to an ending point of the meal, in accordance with an embodiment of the present principles.

A succession of visual images 500 of each customer 270, 280 is presented.

A first visual image 510 depicts the customer 270 having a first facial expression. The first facial expression is, e.g., a happy expression. The first visual image may have been acquired at a first point in time when the customer 270 sat at "Table 1" of restaurant 210.

A second visual image 512 depicts the customer 270 having a second facial expression. The second facial expression is, e.g., a neutral expression. The second visual image may have been acquired at a second point in time during which the customer 270 is consuming his meal. The second point in time may be, e.g., 5 minutes into consuming his meal.

A third visual image 514 depicts the customer 270 having a third facial expression. The third facial expression is, e.g., a somewhat happy expression. The third visual image may have been acquired at a third point in time during which the customer 270 is consuming his meal. The third point in time may be, e.g., 15 minutes into consuming his meal.

A final visual image 516 depicts the customer 270 having a fourth facial expression. The fourth facial expression is, e.g., a somewhat satisfied expression. The fourth visual image may have been acquired at a final point in time when the customer 270 has indicated to the server that he has completed his meal. The final point in time may be compared to the first point in time to determine overcall customer satisfaction of the meal. Moreover, the first point in time may be compared to, for example, the third point in time, to determine customer satisfaction of the meal between those two points in time (e.g., the first 15 minutes of the meal).

Additionally, the visual images 510, 512, 514, 516 of the facial images of the first customer 270 may be captured by a face recognition device 170, an emotion recognition device 172, a gesture recognition device 174, and a speech recognition device 176. Such data/information may be transmitted to the one or more displays 162 for further processing.

Regarding the second customer 280, a first visual image 520 depicts the customer 280 having a first facial expression. The first facial expression is, e.g., a happy expression. The first visual image may have been acquired at a first point in time when the customer 280 sat at "Table 1" of restaurant 210.

A second visual image 522 depicts the customer 280 having a second facial expression. The second facial expression is, e.g., a disappointed expression. The second visual image may have been acquired at a second point in time during which the customer 280 is consuming her meal. The second point in time may be, e.g., 5 minutes into consuming her meal.

A third visual image 524 depicts the customer 280 having a third facial expression. The third facial expression is, e.g., an unhappy expression. The third visual image may have been acquired at a third point in time during which the customer 280 is consuming her meal. The third point in time may be, e.g., 15 minutes into consuming her meal.

A final visual image 526 depicts the customer 280 having a fourth facial expression. The fourth facial expression is, e.g., a dissatisfied or angry expression. The fourth visual image may have been acquired at a final point in time when the customer 280 has indicated to the server that she has completed her meal. The final point in time may be compared to the first point in time to determine overcall customer satisfaction of the meal. Moreover, the first point in time may be compared to, for example, the third point in time, to determine customer satisfaction of the meal between those two points in time (e.g., the first 15 minutes of the meal).

Additionally, the visual images 520, 522, 524, 526 of the facial images of the second customer 280 may be captured by a face recognition device 170, an emotion recognition device 172, a gesture recognition device 174, and a speech recognition device 176. Such data/information may be transmitted to the one or more displays 162 for further processing.

Further processing may involve comparing the facial expressions of the first and second customers 270, 280 at a similar point in time during the course of the meal. Further processing may also involve comparing facial expressions of customers 270, 280 to other customers that ate at the restaurant during the same time period. Further processing may also involve comparing facial expressions of customers served by the same server or customers served in different sections of the restaurant 210. Further processing may also involve comparing facial expressions of all male customers during different time periods (e.g., morning, lunchtime, dinnertime, happy hour, etc.). Similarly, further processing may also involve comparing facial expressions of all female customers during different time periods (e.g., morning, lunchtime, dinnertime, happy hour, etc.). Alternatively, further processing may involve comparing facial expressions between male and female customers during different time periods. Of course, one skilled in the art may contemplate a plurality of different comparison scenarios to extract desired data/information to provide real-time feedback to the restaurant 210.

Further processing may involve comparing gestures or emotions or moods of the first and second customers 270, 280 at a similar point in time during the course of the meal. For example, each time a hand gesture is detected by each customer 270, 280, the cameras 220 may capture and record such instances of hand gestures and compare them to each other at various points in time. Additionally, the hand gestures may be compared to pre-stored hand gestures to determine whether such hand gestures indicate pleasure or dissatisfaction. Moreover, a distinction may be performed between hand gestures that are a result of conversation versus hand gestures that are a result of, e.g., receiving food items or a result of eating the food items, etc.

Figure 6:
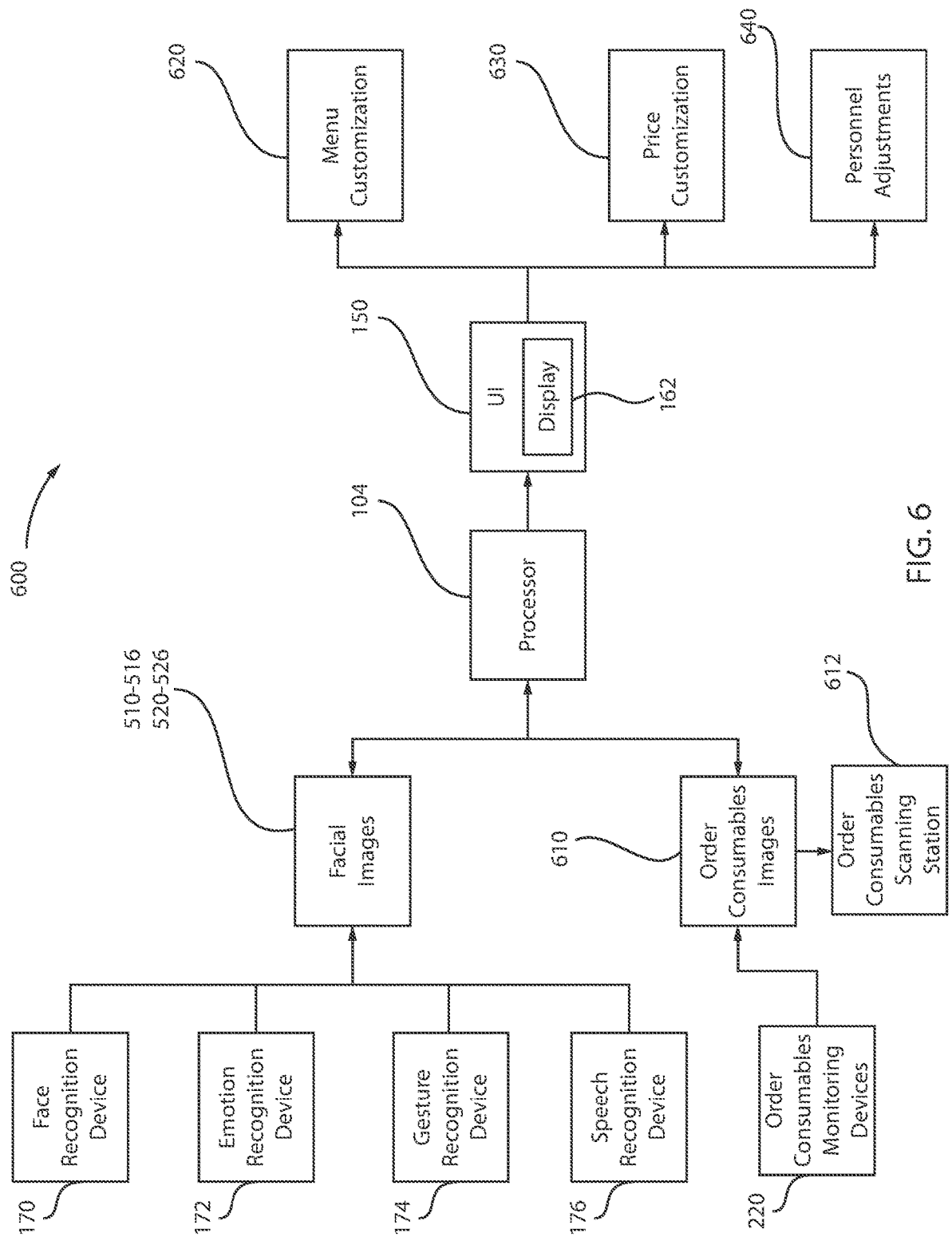
FIG. 6 is a block/flow diagram of an exemplary system for analyzing customer satisfaction with dynamic customization of at least one parameter, in accordance with an embodiment of the present principles.

FIG. 6 is a block/flow diagram of an exemplary system for analyzing customer satisfaction with dynamic customization of at least one parameter, in accordance with an embodiment of the present principles.

The block/flow diagram 600 illustrates a face recognition device 170, an emotion recognition device 172, a gesture recognition device 174, and a speech recognition device 176 for generating facial images 510-516, 520-526 (FIG. 5). Additionally, order consumables monitoring devices or cameras 220 generate order consumables images 610. The order consumables images 610 may be processed by an order consumables scanning station 612. The order consumables scanning station 612 may be a standalone station or kiosk where an employee of the restaurant 210 places the order consumables before being sent to the customer (to obtain a first or initial visual image) and then places the order consumables after the customer finishes the meal (to obtain a second or final visual image). Therefore, in one example embodiment, comparison of initial and final visual images of the order consumables may take place at the order consumables scanning station 612. The order consumables scanning station 612 may be placed somewhere within the restaurant 210, for example, the kitchen area or some other food preparation/food pickup area.

In the block/flow diagram 600, the facial images 510-516, 520-526 and the order consumables images 610 are transmitted to a processor 104 for further processing. The processor 104 communicates with a user interface (UI) 150, which may include one or more displays 162 (FIGS. 4 and 5). Once the data/information is collected and displayed, one or more employees or individuals may access such data/information and dynamically change or alter or modify certain variables/parameters associated with the restaurant 210. For instance, menu customization 620, price customization 630, and personnel adjusting 640 may be dynamically enabled to allow the restaurant to quickly and efficiently optimize its operations on, e.g., a daily basis, if not an hourly basis.

Figure 7:
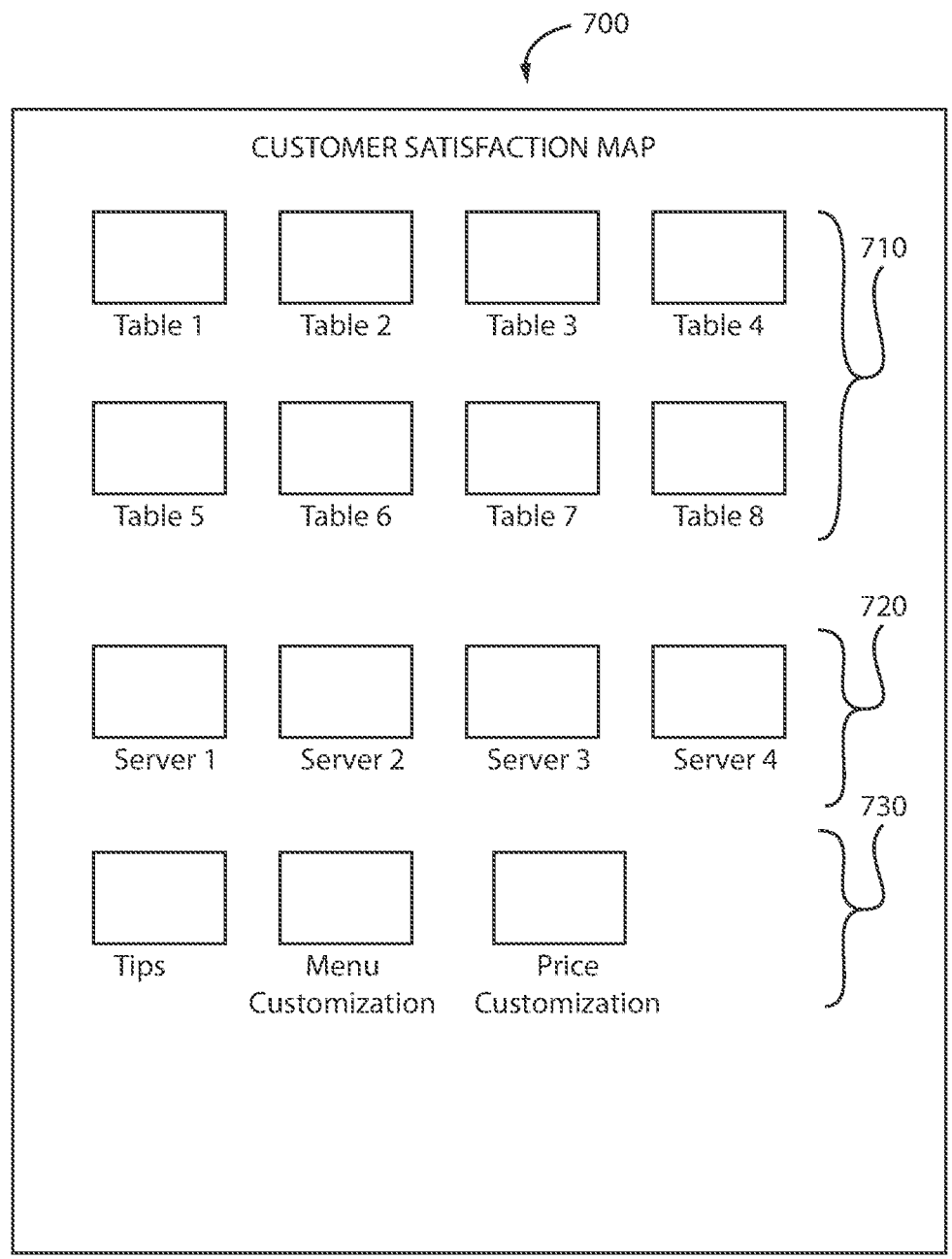
FIG. 7 is a customer satisfaction map displayed on one or more displays, in accordance with an embodiment of the present principles.

FIG. 7 is a customer satisfaction map displayed on one or more displays, in accordance with an embodiment of the present principles.

The customer satisfaction map 700 may be displayed on the one or more displays 162. The customer satisfaction map 700 may include a section 710 for displaying the tables of the restaurant, a section 720 for displaying the names and/or pictures of the servers of the restaurant, and a section 730 for displaying tips received by the servers, as well as menu and price customization options. Of course, one skilled in the art may contemplate monitoring a number of other parameters/variables for display on the customer satisfaction map 700.

Section 710 may display scores associated with satisfaction levels based on the order consumables. For instance, each table may be evaluated and analyzed based on the collected data/information and a corresponding score may be computed and displayed for management to analyze.

Section 720 may also display scores associated with customer satisfaction levels based on server experience. For instance, each server may be evaluated and analyzed based on the collected data/information and a corresponding score may be computed and displayed for management to analyze. For example, a "5 stars" outcome rating for one server or a "thumbs up" outcome rating for another server may be displayed. Scoring modules may thus generate real time scores based on various metrics. Real time scores are generated automatically by calculating and displaying instantaneous scores across different dimensions (e.g., service, ambience, food items, food leftovers, etc.) as soon as visual images are captured.

Moreover, a scoring methodology for analyzing customer satisfaction may be implemented by taking into account visual images received from the face recognition device 170, the emotion recognition device 172, the gesture recognition device 174, and the speech recognition device 176 in combination with a status or a state of the meal. In other words, data related to or extracted from monitoring the meal (from one or more starting points to one or more ending points), in combination with data extracted from face, emotion, gesture, and speech recognition devices 170, 172, 174, 176 are combined to develop one or more scores based on a plurality of different variables/parameters. The one or more scores may be dynamically displayed on the customer satisfaction map 700 and may be automatically updated as real-time data is collected after completion of each meal or after scanning of each plate at, for example, the order consumables scanning station 612 (FIG. 6).

For example, a total score of a server may be computed by collecting several scores or sub-scores based on different factors. A first score for the server may be determined from hand gestures (e.g., factor 1) of the customer 270. A second score of the server may be determined from facial expressions (e.g., factor 2) of the customer 280. A third score of the server may be determined from leftover items (e.g., factor 3) on one or more plates of both customers 270, 280. A fourth score of the server may be determined from speech recognition data (e.g., factor 4) related to the second customer 280 only. The first, second, third, and fourth scores may be combined to compute a single overall score for the server. Therefore, meal factors may be combined with visual images (e.g., of facial images, gestures, etc.) to compute one or more scores of all the restaurant support staff. The overall score of the server may be compared to other overall scores of other servers or restaurant support staff.

Mitigating factors may also be included or taken into account when computing the overall score. For instance, if it is known that certain tables next to windows generally receive higher scores than tables next to the kitchen and/or bathrooms, and the server only had tables assigned to him/her next to the kitchen/bathrooms, then a mitigating factor may be applied to his/her overall score. For example, if the overall score of the server from the above 4 factors was 84, the incorporation of the mitigating factor would raise his/her score to 88, since he was at a disadvantage because of bad table assignment by the restaurant management.

Based on the results of sections 710, 720, the management may dynamically modify or customize or refine the existing menu or the existing pricing items or provide feedback to the servers on their performance throughout the day. The server performance may be evaluated based on the tips each server received from each table waited by each server. Additionally, server performance may be evaluated based on a comparison of received tips between the servers throughout the day. Therefore, the continuous video monitoring of customers and order consumables enables the restaurant to receive real-time feedback to allow for constant and dynamic customization or refinement of variables/parameters to optimize restaurant profits.

For example, if it is determined that customers don't consume a specified food item (e.g., broccoli) with their meals, then the restaurant can immediately substitute such food item with a different food item (e.g., baked potato). Also, if it is determined that a certain dish is being consumed by a high number of customers, then the restaurant can make a decision of whether to increase the price of such offered dish. Further, portion sizing may be optimized based on how much of an item customers consume.

In another embodiment, the customer satisfaction map 700 may display or transmit notifications, warnings, or alerts if one or more thresholds have been exceeded. The notifications, warnings, or alerts may be visual indications or audible indications or a combination of both. The notifications, warnings, or alerts may be wirelessly transmitted to one or more mobile devices operated or handled by the restaurant management. Therefore, restaurant management need not only consult the customer satisfaction map 700 when notifications, warnings, or alerts are triggered. Instead, mobile devices may be in constant communication with the customer satisfaction map 700 to prompt the restaurant management to act in response to one or more thresholds that have been exceeded or in advance of a measured negative impact on customer satisfaction.

Thus, customer satisfaction or dissatisfaction levels allow a restaurant to continuously change pricing of items and/or menu items themselves on a continuous basis. These items may be changed on a daily basis or may be changed based on different circumstances (e.g., time of day, time of month, holidays, special occasions, sporting events shown on TVs, etc.).

Figure 8:
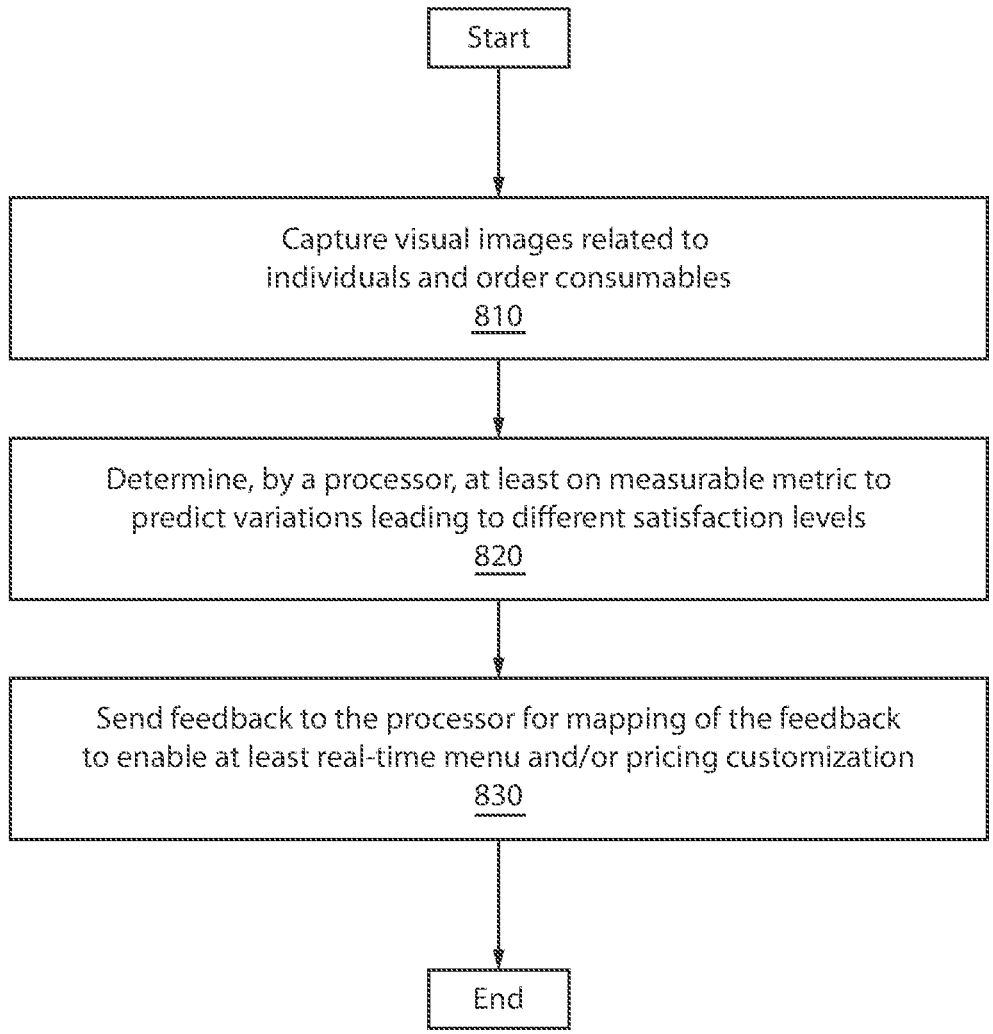
FIG. 8 is a block/flow diagram of an exemplary method for analyzing customer satisfaction, in accordance with an embodiment of the present principles.

FIG. 8 is a block/flow diagram of an exemplary method for analyzing customer satisfaction, in accordance with an embodiment of the present principles.

At block 810, visual images related to individuals and order consumables are captured.

At block 820, at least one measurable metric is determined, by a processor, to predict variations leading to different satisfaction levels.

At block 830, feedback is sent to the processor for mapping of the feedback to enable at least real-time menu and/or pricing customization.

Figure 9:
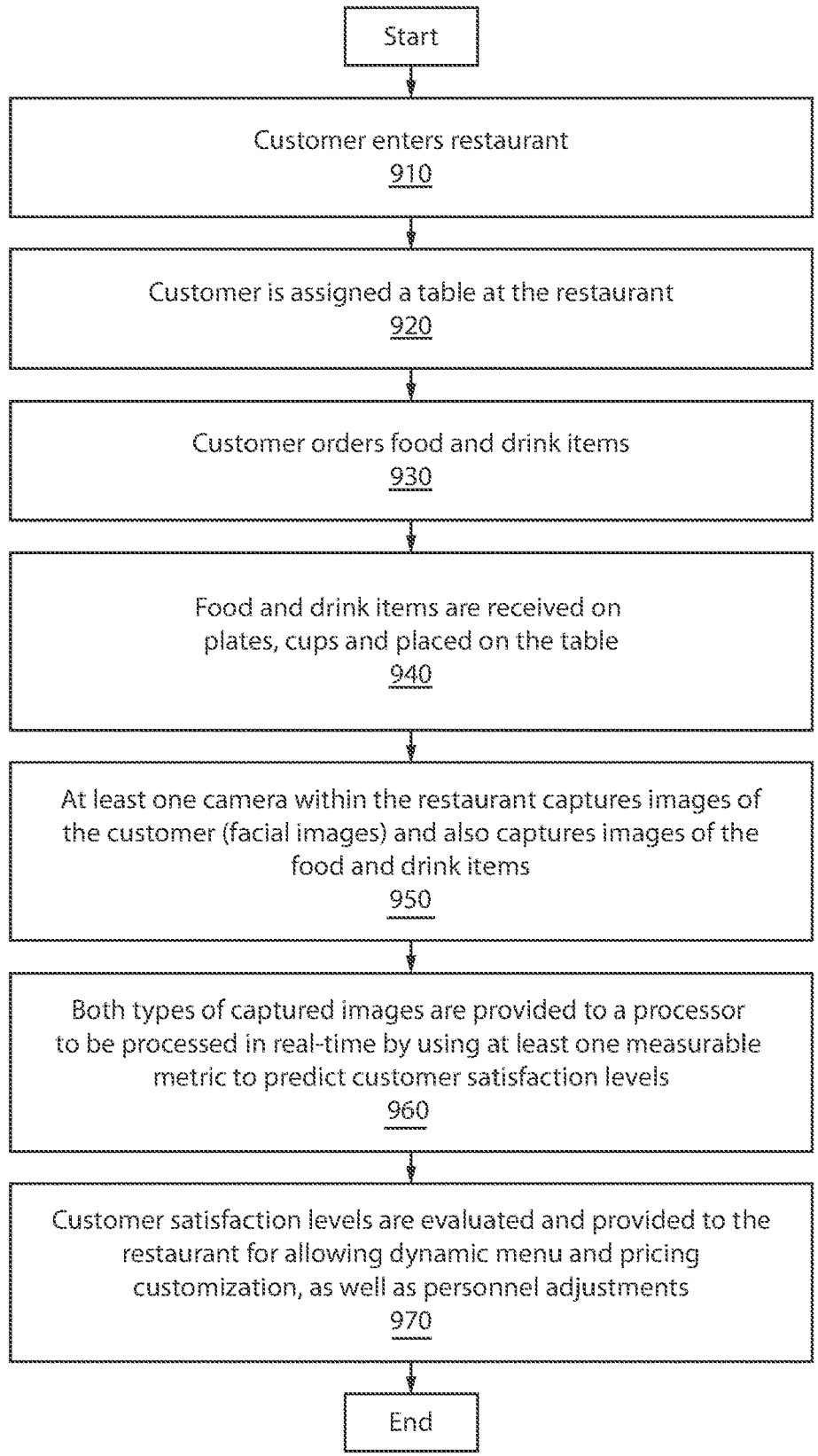
FIG. 9 is a block/flow diagram of an exemplary method for analyzing customer satisfaction, in accordance with an embodiment of the present principles.

FIG. 9 is a block/flow diagram of an exemplary method for analyzing customer satisfaction, in accordance with an embodiment of the present principles.

At block 910, a customer enters the restaurant.

At block 920, the customer is assigned a table at a restaurant.

At block 930, the customer orders food and drink items.

At block 940, the food and drink items are received on plates and cups, respectively, and placed on the table.

At block 950, at least one camera within the restaurant captures images of the customer (facial images) and further captures images of the food and drink items on the plates and cups, respectively.

At block 960, both types of captured images are provided to a processor to be processed in real-time by using at least one measurable metric to predict customer satisfaction levels.

At block 970, customer satisfaction levels are evaluated and provided to the restaurant for allowing dynamic menu and pricing customization, as well as personnel adjustments.

Figure 10:
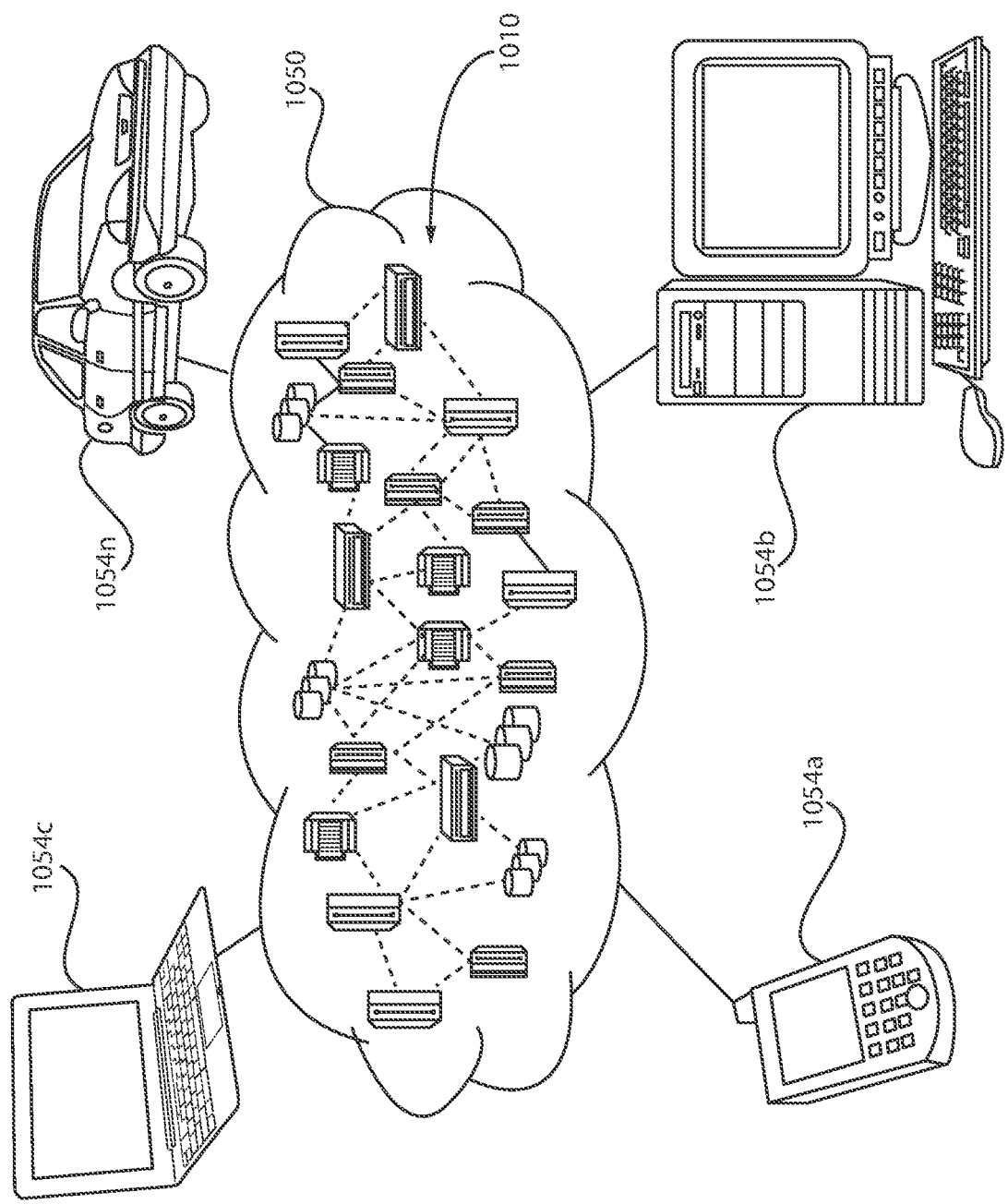
FIG. 10 is a block/flow diagram of an exemplary cloud computing environment, in accordance with an embodiment of the present principles.

FIG. 10 is a block/flow diagram of an exemplary cloud computing environment, in accordance with an embodiment of the present principles.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 10, illustrative cloud computing environment 1050 is depicted for use with analyzing customer satisfaction at, for example, a restaurant. As shown, cloud computing environment 1050 includes one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 1054N may communicate. Nodes 1010 may communicate with one another. They may be grouped (not shown) physically or virtually, in one or more networks, such as Private, Community, Public, or Hybrid clouds as described hereinabove, or a combination thereof. The network may also be a customer satisfaction network at, for example, a restaurant. This allows cloud computing environment 1050 to offer infrastructure, platforms and/or software as services for which a cloud consumer does not need to maintain resources on a local computing device. It is understood that the types of computing devices 1054A-N shown in FIG. 10 are intended to be illustrative only and that computing nodes 1010 and cloud computing environment 1050 can communicate with any type of computerized device over any type of network and/or network addressable connection (e.g., using a web browser).

Figure 11:
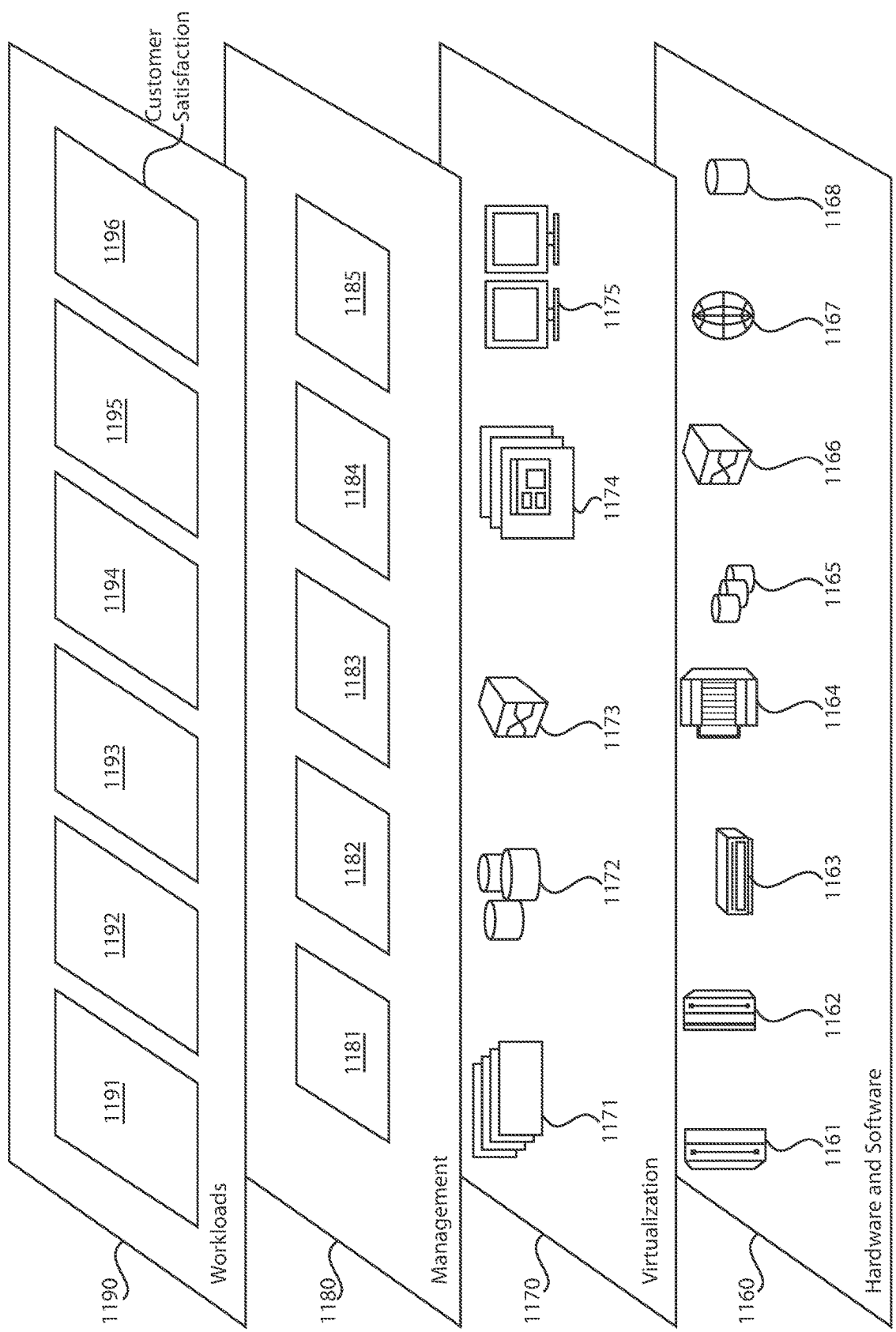
FIG. 11 is a schematic diagram of exemplary abstraction model layers, in accordance with an embodiment of the present principles.

FIG. 11 is a schematic diagram of exemplary abstraction model layers, in accordance with an embodiment of the present principles. It should be understood in advance that the components, layers, and functions shown in FIG. 11 are intended to be illustrative only and embodiments of the invention are not limited thereto. As depicted, the following layers and corresponding functions are provided:

Hardware and software layer 1160 includes hardware and software components. Examples of hardware components include: mainframes 1161; RISC (Reduced Instruction Set Computer) architecture based servers 1162; servers 1163; blade servers 1164; storage devices 1165; and networks and networking components 1166. In some embodiments, software components include network application server software 1167 and database software 1168.

Virtualization layer 1170 provides an abstraction layer from which the following examples of virtual entities may be provided: virtual servers 1171; virtual storage 1172; virtual networks 1173, including virtual private networks; virtual applications and operating systems 1174; and virtual clients 1175.

In one example, management layer 1180 may provide the functions described below. Resource provisioning 1181 provides dynamic procurement of computing resources and other resources that are utilized to perform tasks within the cloud computing environment. Metering and Pricing 1182 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1183 provides access to the cloud computing environment for consumers and system administrators. Service level management 1184 provides cloud computing resource allocation and management such that required service levels are met. Service Level Agreement (SLA) planning and fulfillment 1185 provide pre-arrangement for, and procurement of, cloud computing resources for which a future requirement is anticipated in accordance with an SLA.

Workloads layer 1190 provides examples of functionality for which the cloud computing environment may be utilized. Examples of workloads and functions which may be provided from this layer include: mapping and navigation 1191; software development and lifecycle management 1192; virtual classroom education delivery 1193; data analytics processing 1194; transaction processing 1195; and customer satisfaction 1196.

In some embodiments, meal staging analytics may also be collected and analyzed. For example, monitoring may involve calculating how much time it takes each stage of a meal to be consumed. Based on such data/information, different anomalies or variations may be determined and such data/information may be used to retrain servers or other support staff within the restaurant.

In some embodiments, facial analytics may also be collected and analyzed to determine the mood of customers from the time customers enter a restaurant up to the time the customers exit the restaurant and its premises. For example, monitoring may involve correlating mood changes to events, such as seating at certain tables to gauge reaction of customers, presentation of food items to gauge customer reactions to appearance of consumable items, interactions between customers and servers, bill payment, etc.

In some embodiments, analytics may be used to monitor and predict a number of customers who enter the restaurant at any given day or date or time, and what items such customers might order. The servers or restaurant support staff may be calibrated based on such analytics. For example, if a certain day of the week, say Tuesday, sees a lower demand between 11 am and 3 pm for lunch customers compared to other days of the week, the restaurant may decide to only assign 2 servers to Tuesdays, instead of the usual 5 servers per day between 11 am and 3 pm. Therefore, the restaurant can save money by better managing its resources by evaluating historical data related to monitoring of the individuals to predict future foot traffic trends.

In some embodiments, the tables and tableware may include processing units to collect data/information regarding food consumption, waste of food, drink consumption, waste of drinks, etc. This information can be transmitted to the one or more displays 162 to further refine or calibrate or dynamically modify at least menus, pricing, servings, and/or restaurant support staff.

Still yet, any of the components of the present invention could be created, integrated, hosted, maintained, deployed, managed, serviced, etc. by a service supplier who offers to provide a method for analyzing customer feedback with respect to a product or service. Thus the present invention discloses a process for deploying, creating, integrating, hosting, maintaining, and/or integrating computing infrastructure, including integrating computer-readable code into the computer system 100 (FIG. 1), wherein the code in combination with the computer system 100 is capable of performing a method for providing a method for analyzing customer feedback with respect to a product or service. In another embodiment, the invention provides a business method that performs the process steps/blocks of the invention on a subscription, advertising, and/or fee basis. That is, a service supplier, such as a Solution Integrator, could offer to provide a method for analyzing customer feedback with respect to a product or service. In this case, the service supplier can create, maintain, support, etc. a computer infrastructure that performs the process steps/blocks of the invention for one or more customers. In return, the service supplier can receive payment from the customer(s) under a subscription and/or fee agreement and/or the service supplier can receive payment from the sale of advertising content to one or more third parties.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps/blocks to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for analyzing customer satisfaction at a restaurant, comprising:
   capturing and comparing before and after visual images related to facial expressions and hand gestures of customers and to content and consumption levels of order consumables;
   determining, by a processor, one or more measurable metrics to predict facial expression and hand gesture variations indicating different satisfaction levels;
   creating a customer satisfaction map to provide feedback to restaurant management; and
   dynamically refining menu and price parameters, in real-time, if the facial expression and hand gesture variations exceed one or more facial expression and hand gesture thresholds,
   wherein the customer satisfaction map displays at least tables of the restaurant, names and pictures of servers, menu and price customization options, and alerts.

2. The method of claim 1, wherein the alerts are triggered in accordance with predetermined weights assigned to the one or more measurable metrics.

3. The method of claim 2, further comprising displaying, on the customer satisfaction map, an overall score of each of the servers.

4. The method of claim 3, wherein the overall score is based on a collection of sub-scores related to server-customer interactions.

5. The method of claim 1, wherein the different satisfaction levels are related to at least order consumables and server experience.

6. The method of claim 1, wherein dynamically refining the menu parameters and price parameters triggers real-time instructions to restaurant staff.

7. The method of claim 1, further comprising receiving the captured visual images of the customers and the order consumables by least one camera in communication with the processor.

8. The method of claim 7, further comprising extracting features from facial images of the customers captured by at least one camera to assess human emotional behavior.

9. The method of claim 1, further comprising periodically updating predetermined weights assigned to the one or more measurable metrics to reflect real-time changes to the one or more measurable metrics.

10. A system for analyzing customer satisfaction at a restaurant, comprising:
    at least one camera to capture before and after images compared based on facial expressions and hand gestures of customers and compared based on content and consumption levels of order consumables; and
    a processor coupled to the at least one camera to apply at least one measurable metric to predict facial expression and hand gesture variations indicating different satisfaction levels related to at least order consumables and server experience and to dynamically refine menu and price parameters, in real-time, if the facial expression and hand gesture variations exceed one or more facial expression and hand gesture thresholds,
    wherein a customer satisfaction map is created to provide feedback to restaurant management, and wherein the customer satisfaction map displays at least tables of the restaurant, names and pictures of servers, menu and price customization options, and alerts.

11. The system of claim 10, wherein the alerts are triggered in accordance with predetermined weights assigned to the one or more measurable metrics.

12. The system of claim 11, wherein an overall score of each of the servers is displayed on the customer satisfaction map.

13. The system of claim 12, wherein the overall score is based on a collection of sub-scores related to server-customer interactions.

14. The system of claim 10, wherein dynamically refining the menu parameters and price parameters triggers real-time instructions to restaurant staff.

15. The system of claim 10, wherein the at least one measurable metric is at least one of meal rate, meal item consumption, amount of leftover meal, amount of leftover meal item, customer reaction upon initial consumption, customer reaction during consumption, and customer reaction after consumption.

16. The system of claim 10, wherein a comparison of the captured visual images related to the order consumables is performed between a first point in time and a second point in time.

17. The system of claim 16, wherein the first point in time is a starting point of a meal and the second point in time is an ending point of the meal.

18. The system of claim 10, wherein predetermined weights assigned to the one or more measurable metrics are periodically updated to reflect real-time changes to the one or more measurable metrics.

* * * * *